(12) United States Patent
Tanimoto

(10) Patent No.: US 7,843,589 B2
(45) Date of Patent: Nov. 30, 2010

(54) IMAGE FORMING SYSTEM AND IMAGE FORMING APPARATUS

(75) Inventor: Kazuhito Tanimoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 989 days.

(21) Appl. No.: 11/653,411

(22) Filed: Jan. 16, 2007

(65) Prior Publication Data

US 2007/0279679 A1   Dec. 6, 2007

(30) Foreign Application Priority Data

Jun. 2, 2006  (JP) .............................. 2006-154411
Jun. 2, 2006  (JP) .............................. 2006-154700

(51) Int. Cl.
*G06F 15/00* (2006.01)
*G06F 1/00* (2006.01)

(52) U.S. Cl. ..................................... 358/1.15; 713/323

(58) Field of Classification Search ................. 713/323, 713/320, 300, 165; 358/1.15, 1.13, 1.14, 358/1.16, 1.18, 520, 1.6, 296, 1.8; 455/574, 455/522, 90.03, 517, 410; 399/8, 18, 33, 399/69, 75; 711/100; 714/22, 806, 809, 714/818

See application file for complete search history.

(56) References Cited

U.S. PATENT DOCUMENTS 6,519,650 B1 * 2/2003 Kawasaki et al. ........... 709/244

6,665,719 B1   12/2003 Isoda

FOREIGN PATENT DOCUMENTS

| JP | A 7-200216 | 8/1995 |
|----|------------|--------|
| JP | A 11-45160 | 2/1999 |
| JP | A 2000-36824 | 2/2000 |
| JP | A 2005-86555 | 3/2005 |

* cited by examiner

*Primary Examiner*—Saeid Ebrahimi Dehkordy
(74) *Attorney, Agent, or Firm*—Oliff & Berridge, PLC

(57) ABSTRACT

An image forming system includes an image forming apparatus and a user interface device. The image forming apparatus accepts a print command and forms an image according to the print command. The user interface device communicates with the image forming apparatus. Power control and power supply are performed for the image forming apparatus and the user interface device separately. The image forming apparatus includes a detection section, a storage section, a re-establishment section and a mode control section. The detection section detects as to whether or not communication between the image forming apparatus and the user information device is disconnected. The storage section stores modes of the image forming apparatus and user interface device when the detection section detects disconnection. The re-establishment section re-establishes the communication. The mode control section controls modes, after the re-establishing, of the image forming apparatus and user interface device based on the stored modes.

21 Claims, 18 Drawing Sheets

SELECT ONE MODE FROM AMONG THE FOLLOWINGS AS A MODE TO BE PERFORMED WHEN DISCONNECTED COMMUNICATION IS RE-ESTABLISHED, AND PRESS "ENTER."

MODE WHEN COMMUNICATION WAS DISCONNECTED

NORMAL OPERATION MODE

DIAGNOSIS MODE

DOWNLOAD MODE

ENTER

FIG. 6

SELECT ONE MODE FROM AMONG THE FOLLOWINGS AS A MODE TO BE APPLIED WHEN PRINTER AND UI DEVICE ARE DIFFERENT IN MODE WHEN COMMUNICATION IS DISCONNECTED, AND PRESS "ENTER."

APPLY A MODE OF THE PRINTER

APPLY A MODE OF THE UI DEVICE

ENTER

FIG. 9

SET TIME PERIODS FOR THE UI DEVICE AND PRESS "ENTER."

TIME PERIOD UNTIL UI DEVICE CHANGES
TO SCREEN SAVE

△ ☐ HOURS   △ ☐ MINUTES
▽            ▽

TIME PERIOD UNTIL THE UI DEVICE CHANGES
TO POWER-SAVING STATE

△ ☐ HOURS   △ ☐ MINUTES
▽            ▽

TIME PERIOD UNTIL THE UI DEVICE IS TURNED OFF

△ ☐ HOURS   △ ☐ MINUTES
▽            ▽

ENTER

FIG. 11

SELECT ONE FROM AMONG THE FOLLOWINGS AS ACTION TO BE TAKEN WHEN COMMUNICATION IS DISCONNECTED DURING JOB EXECUTION, AND PRESS "ENTER."

- IMMEDIATELY STOP A JOB
- STOP JOBS IN SET UNITS
- STOP AFTER A JOB BEING EXECUTED IS FINISHED
- STOP AFTER ALL JOBS ALREADY ACCEPTED ARE FINISHED

ENTER

FIG. 13

DISCONNECTED COMMUNICATION HAS BEEN RE-ESTABLISHED. SELECT EITHER OF THE FOLLOWINGS AS ACTION TO BE TAKEN FOR THE STOPPED JOB, AND PRESS "ENTER."

RESTART THE STOPPED JOB

CANCEL THE STOPPED JOB

ENTER

FIG. 14

SELECT EITHER OF THE FOLLOWINGS FOR ACCEPTANCE OF JOB AFTER COMMUNICATION IS DISCONNECTED DURING JOB EXECUTION, AND PRESS "ENTER."

NEW JOB IS NOT ACCEPTED

NEW JOB IS ACCEPTED, BUT IS NOT EXECUTED

ENTER

FIG. 15

SELECT EITHER OF THE FOLLOWING AS THE ACTION
TO BE TAKEN WHEN A JOB STOP CAUSE OCCURS DURING
JOB EXECUTION AFTER COMMUNICATION IS DISCONNECTED,
AND PRESS "ENTER."

KEEP STOPPING A JOB UNTIL A JOB
STOP FACTOR IS REMOVED

EXECUTE EXECUTABLE JOBS

ENTER

FIG. 17

SET TIME PERIODS FOR THE PRINTER AND PRESS "ENTER."

TIME PERIOD UNTIL THE PRINTER CHANGES TO POWER-SAVING STATE

△ ▽ [ ] HOURS   △ ▽ [ ] MINUTES

TIME PERIOD UNTIL THE PRINTER IS TURNED OFF

△ ▽ [ ] HOURS   △ ▽ [ ] MINUTES

ENTER

FIG. 18

IMAGE FORMING SYSTEM AND IMAGE FORMING APPARATUS

CROSS-REFERENCE TO RELATED APPLICATIONS

This application is based on and claims priority under 35 U.S.C. §119 from Japanese Patent Application No. 2006-154700 filed Jun. 2, 2006 and Japanese Patent Application No. 2006-154411 filed Jun. 2, 2006.

BACKGROUND

Technical Field

This invention relates to an image forming system and image forming apparatus.

SUMMARY

According to an aspect of the invention, an image forming system includes an image forming apparatus and a user interface device. The image forming apparatus accepts a print command from an external device and forms an image on a recording material according to the print command. The user interface device is connected to the image forming apparatus so as to be able to communicate with the image forming apparatus. The user interface device accepts entry from a user, outputs the entry to the image forming apparatus and displays information based on data input from the image forming apparatus. Power control and power supply are performed for the image forming apparatus and the user interface device separately. The image forming apparatus includes a detection section, a storage section, a re-establishment section and a mode control section. The detection section detects as to whether or not communication between the image forming apparatus and the user information device is disconnected. The storage section stores a mode of the image forming apparatus and a mode of the user interface device when the detection section detects that the communication is disconnected. The re-establishment section re-establishes the disconnected communication between the image forming apparatus and the user interface device. The mode control section controls (i) a mode, after the re-establishing by the re-establishment section, of the image forming apparatus and (ii) a mode, after the re-establishing by the re-establishment section, of the user interface device based on the mode of the image forming apparatus and the mode of the user interface device, which are stored in the storage section.

BRIEF DESCRIPTION OF THE DRAWINGS

Exemplary embodiments of the invention will be described in detail based on the following figures, wherein:

FIG. 5 is a diagram showing an example of an operation screen of a UI device in the case where process content, which is to be performed when communication is disconnected, is set;

FIG. 6 is a diagram showing an example of the operation screen of the UI device in the case where process content, which is to be performed when communication is disconnected, is set;

FIG. 9 is a diagram showing an operation screen of the UI device of the seventh example, for setting conditions of changing the UI device to a screen save, the power-saving state and the power-off;

FIG. 11 is a diagram showing an example of an operation screen of a user interface in the case where process content, which is performed when communication is disconnected, is set;

FIG. 13 is an example of the operation screen of the UI device in the case where process content for a stopped job is set;

FIG. 14 is a diagram showing an example of the operation screen of the user interface in the case where process content relating to acceptance of another job after the communication has been disconnected during execution of a job;

FIG. 15 is a diagram showing an example of the operation screen of the user interface in the case where process content, which is performed when a cause of stopping job occurs during execution of job after the communication has been disconnected;

FIG. 17 is a diagram showing an example of the operation screen of the UI device according to a fourth exemplary embodiment, for setting a condition of changing a printer to a power-saving state and power-off; and FIG. 18 is a diagram showing an example of the operation screen of the UI device according to the fourth exemplary embodiment, for setting a condition of changing the UI device to a screen saver, the power-saving state and the power-off.

DETAILED DESCRIPTION

Exemplary embodiments of the invention will be described in detail with reference to the accompanying drawings.

Figure 1:
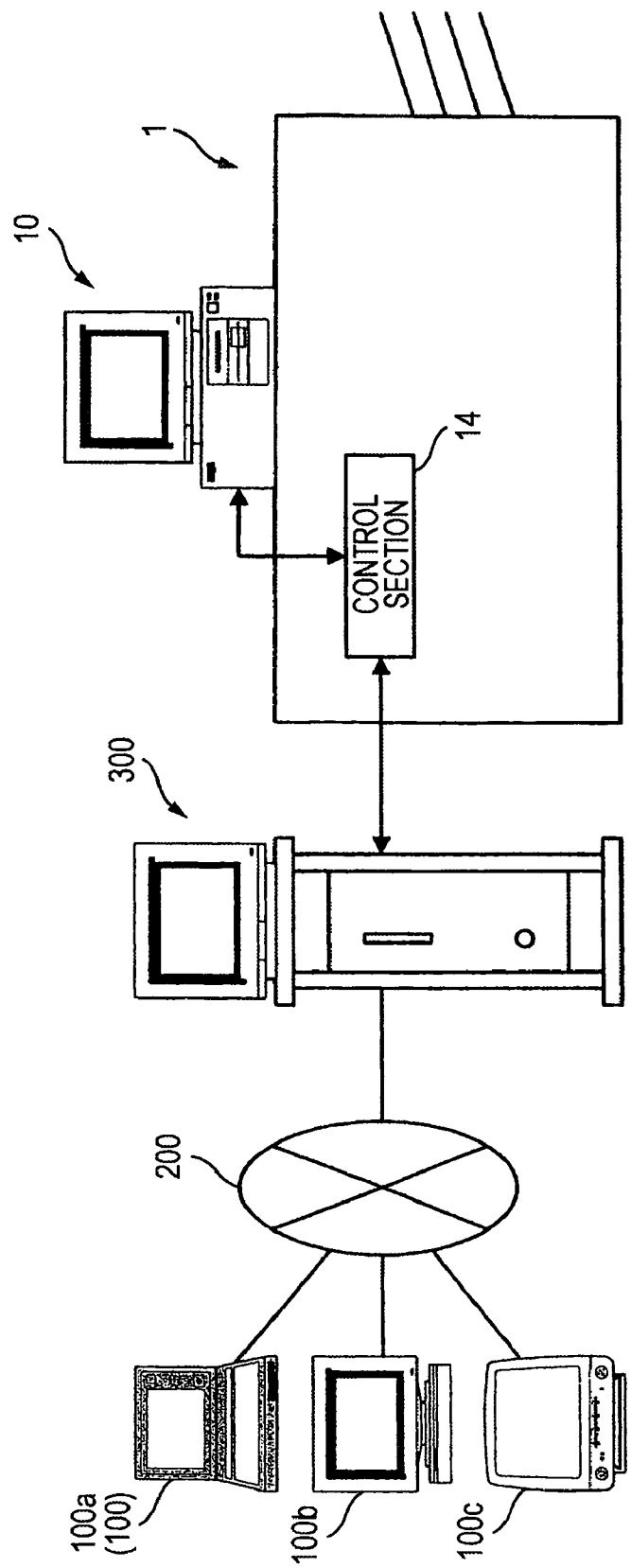
FIG. 1 is a diagram showing a configuration example of an image forming apparatus according to exemplary embodiments of the invention.

FIG. 1 is a diagram showing a configuration example of an image forming apparatus according to this exemplary embodiment of the invention The image forming system includes plural clients 100 (specifically, 100a, 100b, and 100c), a network 200, an external controller 300, a printer 1 and a UI (User Interface) unit 10.

Each of the clients 100 transmits job data containing print data written in a PDL (Page Description Language) and an execution command of image forming operation, for example.

The external controller 300, which may serve as a converter, interprets the job data, which is image data received through the network 200, and transmits obtained image forming data (bit map data).

The printer 1, which may serve as an image forming apparatus, forms an image on target paper based on the image forming data received from the external controller 300.

The UI device 10, which may serve as a user interface device, has a casing different from the printer 1 and may be implemented as a computer such as a PC (Personal Computer), for example. The UI device 10 accepts settings of various image forming conditions for the printer 1 and transmits the obtained setup data to the printer 1.

In the printer 1, a control section as mode control section or a device controller 14 sets the various image forming conditions based on the received setup data. If an error of a paper-out condition, for example, occurs, the printer 1 transmits obtained error information to the UI device 10. In this case, the UI device 10 displays the received error information on a display. The printer 1 includes the device controller 14 described later.

The UI device 10 can be set to a standby state (non-power-saving state) for maintaining a function capable of immediately operating by supplying power to the whole of a CPU (Central Processing Unit), memory 10b (see FIG. 2), a storage device such as a hard disk drive and a display such as a liquid crystal display, which make up the computer. The UI device 10 can also be set to a power-saving state for decreasing power consumed by the UI device 10 in a wait mode by stopping or decreasing power supply to some of the CPU, the memory, the storage device and the display. Further, the UI device 10 may be implemented as a PC as described above and an input program of the setup data may run on an OS such as Windows (registered trademark), for example. Thus, the UI device 10 controls the power supply state based on power management standard of ACPI (Advanced Configuration and Power Interface), for example.

Figure 2:
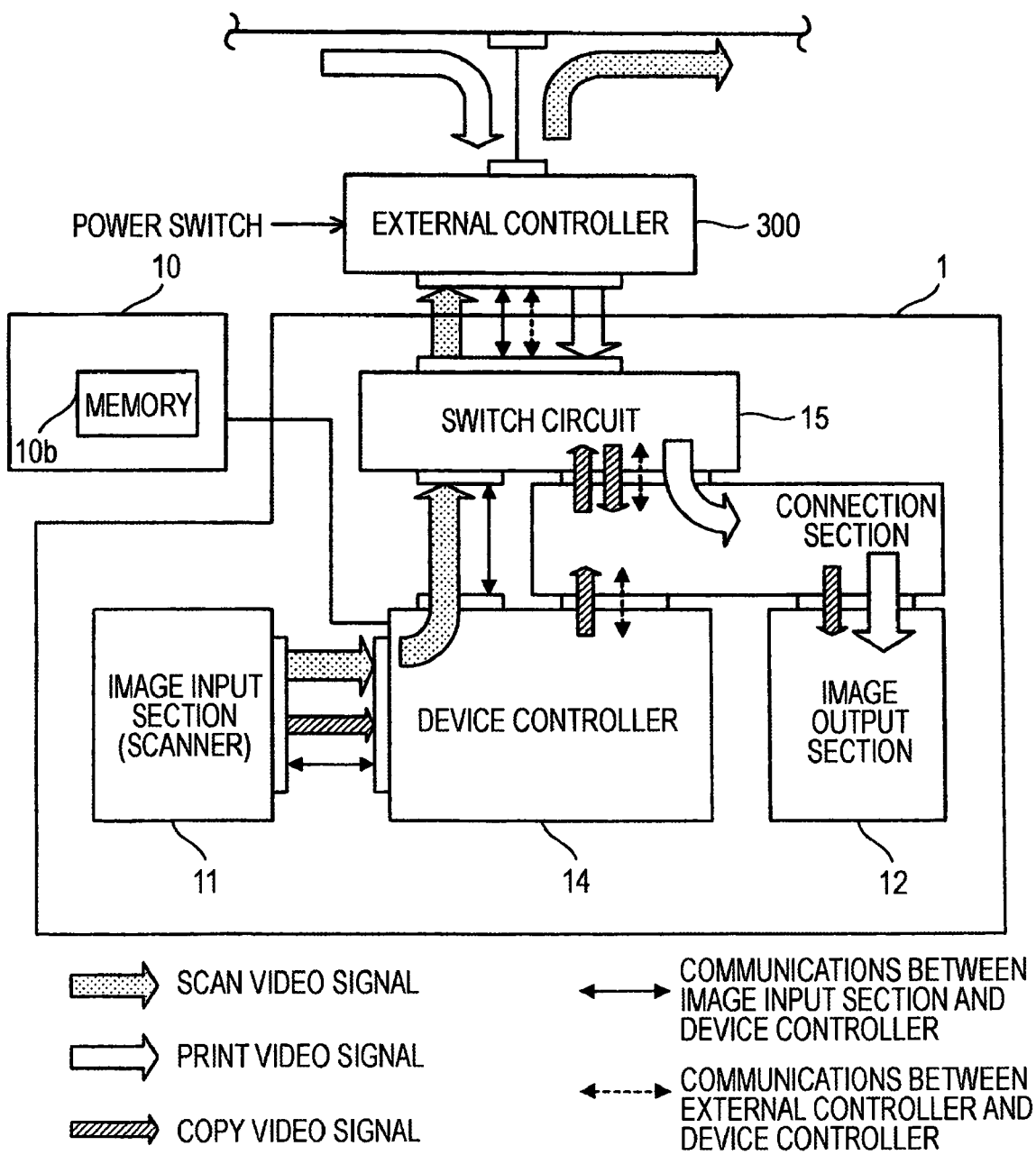
FIG. 2 is a schematic diagram for describing an image forming system according to the exemplary embodiments of the invention.

FIG. 2 is a schematic diagram for describing an image forming system according to this exemplary embodiment.

As shown in FIG. 2, the printer 1 is connected to an external machine through the network. Thus, the printer 1 can receive image data sent from the external machine, for example, via the network.

The printer 1 includes the UI device 10 having a user's operation screen 10a (see FIG. 5), an image input section (scanner) 11 for optically reading an image from an original and an image output section 12 for printing image information on a sheet of paper. In this exemplary embodiment, the external controller 300 is placed outside the printer 1. Alternatively, the external controller 300 may be placed inside the printer 1. In this case, the external controller 300 communicates with the external machine to execute a print job (print command) and a scan job.

The printer 1 includes the device controller 14 for controlling the UI device 10, the image input section 11, the image output section 12 and the external controller 300, and also executing a copy job. The printer 1 includes a switch circuit 15 connected to the external controller 300 by a cable (local network). The switch circuit 15 switches signals among the image output section 12, the external controller 300 and the device controller 14.

Power is controlled and is supplied to the UI device 10 aside from the printer 1. Further, the UI device 10 not only is implemented as the UI device of the printer 1, but also may be implemented as an external device of a computer, etc., for example. The UI device 10 contains the memory 10b.

The printer 1 executes a process of printing image data input via the network by the image output section (printer) 12 (print job) and a process of transferring image data input through the image input section (scanner) 11 of the printer 1 to the external machine via the network (scan job). The printer 1 can also execute a process of processing the image data input through the internal image input section 11 and printing the image data by the internal image output section 12 (copy job).

The external controller 300 creates image data based on a job (print command) transmitted through the network from the external machine, for example, and provides a print service by exclusive control with the device controller 14 on an external controller control IF (interface). The external controller 300 controls a scan job by a network IF and provides a scan service.

When a print job command is given, the image output section 12 receives image data, performs a process of analyzing control commands sequentially, and prints an image on a sheet of paper.

Figure 3:
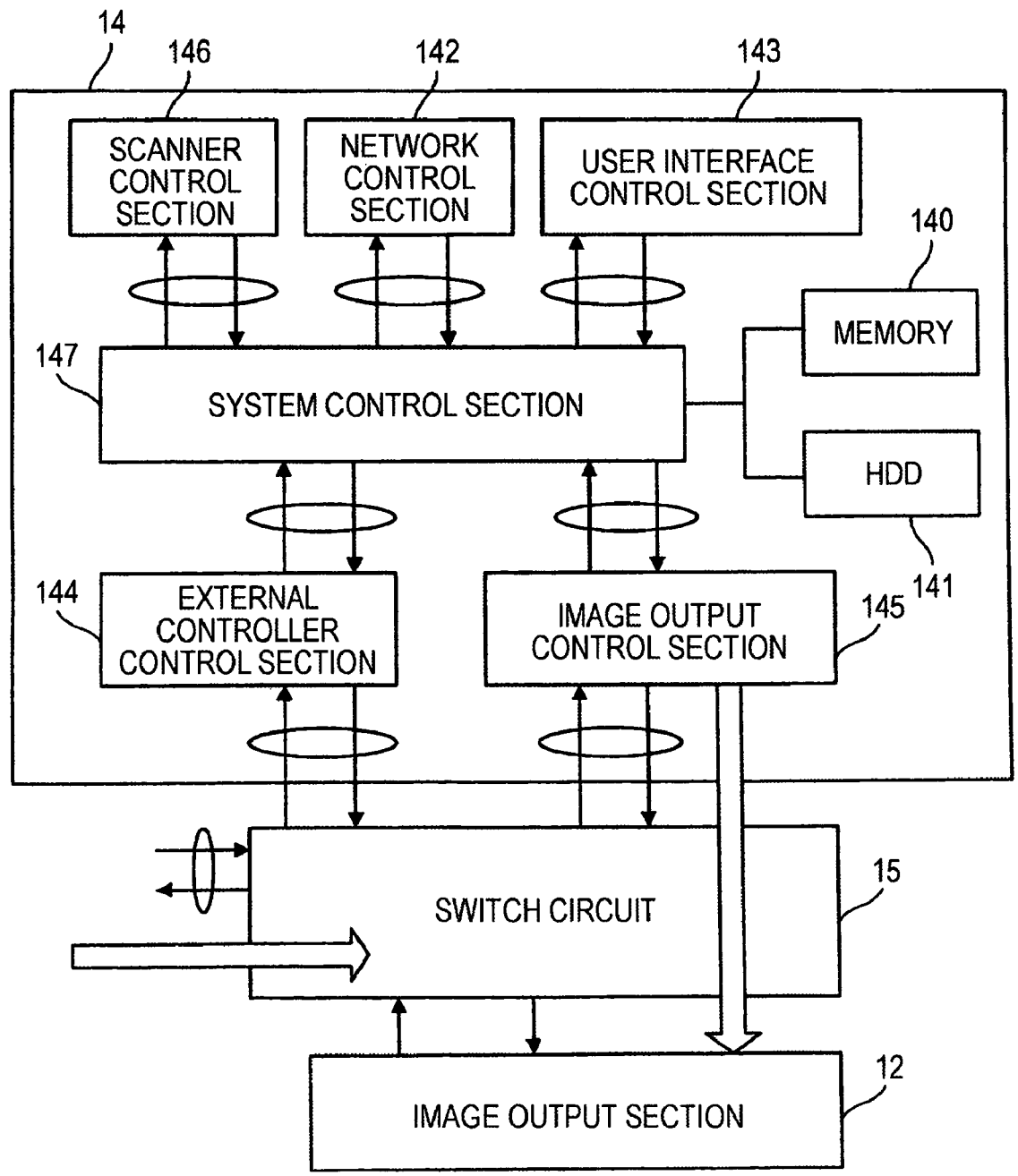
FIG. 3 is a block diagram showing the inner configuration of a device controller.

FIG. 3 is a block diagram showing the inner configuration of the device controller 14.

As shown in FIG. 3, the device controller 14 includes a memory (NMV) 140 and an HDD (hard disk drive) 141, which may serve as a storage device, a network control section 142, a user interface control section 143, an external controller control section (communication control section) 144, an image output control section 145, a scanner control section 146 and a system control section 147. The control sections 142 to 147 may be implemented as control programs.

The user interface control section 143 displays the system state and information required to process a job, on the operation screen 10a of the UI device 10 (see FIG. 5) for guiding the user.

The user interface control section 143 monitors a communication status between the UI device 10 and the printer 1. If the user interface control section 143 detects disconnection of the communication, the user interface control section 143 sends a signal to the system control section 147. That is, the user interface control section 143 may serve as a communication disconnection detection section that detects the disconnection of the communication.

The user interface control section 143 re-establishes the disconnected communication between the device controller 14 and the UI device 10. That is, the user interface control section 143 may serve as a communication re-connection section (re-establishment section) that re-establishes the communication after the UI device is restored.

The user interface control section 143 notifies to the external machine or the external controller 300, the clients 100 (see FIG. 1) and the network UI that the connection to the UI device 10 is disconnected or is recovered. When the communication is recovered, the user interface control section 143 transmits a job history. That is, the user interface control section 143 may serve as a communication control section.

The external controller control section 144 receives an IF command from the external controller 300 when a print job is executed, and executes the print job in accordance with the image input/output sequence to/from the image output section 12. When the external controller 300 request system data, the external controller control section 144 performs a process of acquiring system data in the device controller 14 or a process of acquiring (i) system data in the image input section 11 or (iii) system data the image output section 12 through communication, and converting format of the acquired system data. When a power switch (see FIG. 2) is turned off, the external controller control section 144 also performs a process involved in a shutdown process request in the device controller 14.

The image output control section 145 performs IF control with the image output section 12 mainly when a copy job is executed. The image output control section 145 executes the copy job in accordance with the image input/output sequence to/from the image output section 12.

The scanner control section 146 performs IF control with the image input section 11 mainly when a scan job is executed. The scanner control section 146 executes the scan job in accordance with the image input/output sequence to/from the image input section 11.

The system control section 147 arbitrates plural jobs such as a print job and a copy job as the nucleus of the system, and makes the most of the system resources. If the communication between the UI device 10 and the printer 1 is disconnected due to a defect of software (hang up or stop (quit)) or due to power off of the UI device during job execution, the system control section 147 performs job control for determining a job stop method or a job continuation method. That is, the system control section 147 may serve as job control section.

FIRST EXEMPLARY EMBODIMENT

Figure 4A:
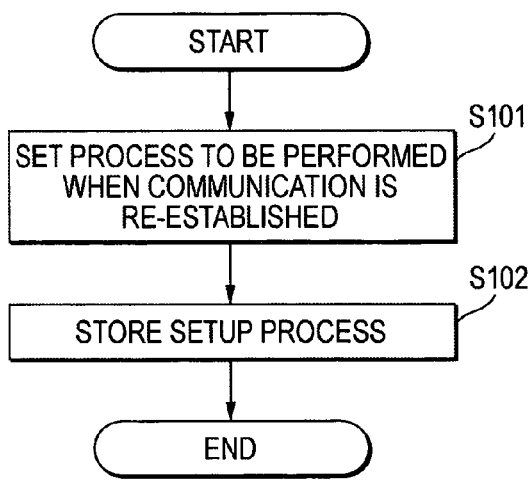
FIGS. 4A to 4C are flowcharts of a process performed by a printer according to a first exemplary embodiment of the invention.
Figure 4B:
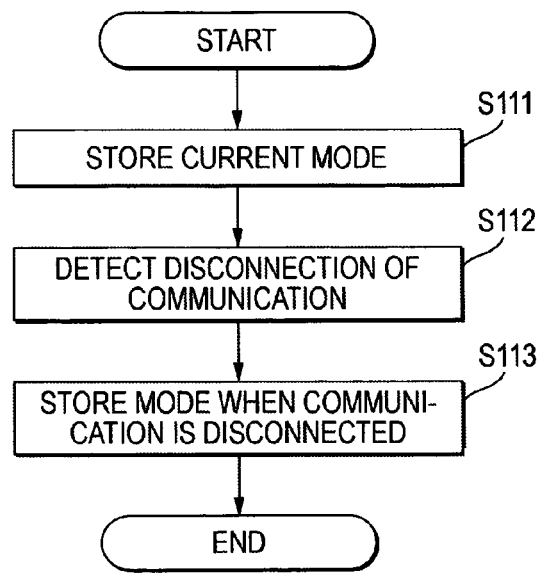
Figure 4C:
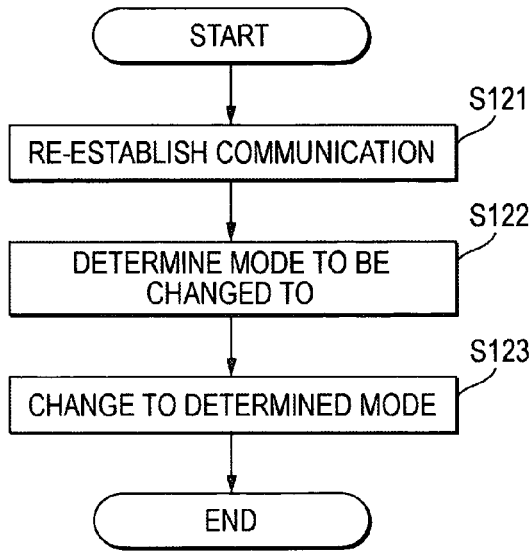

FIGS. 4A to 4C are flowcharts of a process performed by the printer 1 according to the first exemplary embodiment.

As shown in FIG. 4A, first, if the communication between the printer 1 and a UI device 10 is disconnected, a process performed when the communication is re-established is set through the UI device 10 (step 101). That is, when the disconnected communication is re-established, the UI device 10 allows the user to set as to which mode the printer 1 and the UI device 10 change to. The system control section 147 of the device controller 14 (see FIG. 3) stores the setup process description (mode) is stored in memory 140, which may serve as a retention section (see FIG. 3), as information (step 102).

Thus, the user can preset the mode to which the printer 1 and the UI device 10 are made to change when the communication are re-established.

Further, as a cause of disconnecting the communication between the printer 1 and the UI device 10, not only power off of the UI device 10 and power off of the printer 1, but also occurrence of hang up or stop (quit) caused by software (application) if the UI device 10 is a PC can be named. The user interface control section 143 (see FIG. 3) detects that the communication has been disconnected.

FIG. 5 is a diagram showing an example of the operation screen 10a of the UI device 10a in the case where process content, which is to be performed when communication is disconnected, is set. As shown in FIG. 5, the user can select any one of four options as the process content, which is performed when the communication between the UI device 10 and the device controller 14 is re-established. Specifically, the options are "mode when communication was disconnected," "normal operation mode," "diagnosis mode" and "download mode." If the user presses a ENTER button after selecting any one of the four options, the selected one is decided. In the example shown in FIG. 5, the "mode when communication was disconnected" is set as default.

The "mode when communication was disconnected" refers to a mode when the user interface control section 143 (see FIG. 3) detects disconnection of the communication between the printer 1 and the UI device 10. In the exemplary embodiment, the mode when the user interface control section 143 detects disconnection of the communication between the printer 1 and the UI device 10 is any of the "normal operation mode," the "diagnosis mode" or the "download mode."

Thus, in the exemplary embodiment, the mode to which the printer 1 and the UI device 10 change when the communication therebetween is re-established may be selected from (i) the mode when the communication therebetween was disconnected and (ii) any of the "normal operation mode," the "diagnosis mode" and the "download mode," which is designated by a user in advance.

Further, the "normal operation mode" refers to a mode of executing normal image forming. The "diagnosis mode" refers to a mode for the printer 1 to diagnose presence or absence of a failure and a location of the failure, and may be called DIAG mode. The "download mode" refers to a mode of executing a process of rewriting a program. It is also possible to set the mode to any other mode than the three modes described above, for example, "manager mode" or "key operator mode."

FIG. 6 is a diagram showing an example of the operation screen 10a of the UI device 10 in the case where process content, which is to be performed when the communication is disconnected, is set.

As shown in FIG. 6, the user can further select either of two as a process content to be executed when the communication between the UI device 10 and the device controller 14 is re-established. That is, if the user selects the "mode when communication was disconnected" from among the four options shown in FIG. 5, the operation screen 10a shown in FIG. 6 is displayed. Specifically, "apply a mode of the printer" and "apply a mode of the UI device" are displayed.

FIG. 6 will be described in more detail. It is considered that the mode of the printer 1 and the mode of the UI device 10 when the communication is disconnected are usually identical with each other. However, it is not guaranteed that the mode of the printer 1 and the mode of the UI device 10 are always identical. For example, the communication may be disconnected during the time one mode is being changed to another mode. In this case, it is also considered that the mode of the printer 1 and the mode of the UI device 10 are different from each other. Therefore, if the printer 1 and the UI device 10 are different in the mode when the communication is disconnected, which the mode of the printer 1 and the mode of the UI device 10 should be assigned priority to may be set in advance. Such settings may be made on the operation screen 10a shown in FIG. 6.

Turning again to FIG. 4, the description is continued. Specifically, a description will be given with reference to the flowchart of FIG. 4B.

After the mode to be applied when the communication is re-established is set according to the flowchart of FIG. 4A, a process shown in the flowchart of FIG. 4B is executed.

First, the current mode is detected and the detection result is stored in the memory 140 (step 111). That is, if the device controller 14 detects that a mode is changed, the previous mode is overwritten with the new mode in the memory 140. In so doing, the device controller 14 can keep track of the mode when the communication was disconnected by reading the write content in the memory 140 at the point in time when the user interface control section 143 detected the disconnection of the communication.

Further, in the exemplary embodiment, both of the mode of the printer 1 and the mode of the UI device 10 are stored in the memory 140 for the purpose of making it possible to deal with the case where the mode of the printer 1 and the mode of the UI device 10 are different as described above.

Of course, it is also considered that the mode of the printer 1 or the mode of the UI device 10 is stored in the memory 140.

In this case, setting made on the operation screen 10a shown in FIG. 6 becomes unnecessary and a simple configuration can be achieved.

Further, as the setting of the process to be performed at the re-establishment time (step 101), the mode of the printer 1 and the mode of the UI device 10 may change to a fixed mode, which is designated in advance (in the exemplary embodiment, any of the normal operation mode, the diagnosis mode and the download mode), irrespective of the mode when the communication is disconnected. In so doing, it is not necessary to store the current mode and a simple configuration can be achieved. Saying in addition, if such a configuration is adopted, "mode when communication was disconnected" is not displayed on the operation screen 10a shown in FIG. 5.

After step 111 is executed, the user interface control section 143 (see FIG. 3) monitors presence or absence of communication between the printer 1 and the UI device 10. If the user interface control section 143 detects disconnection of the communication therebetween (step 112), the system control section 147 reads the mode of the printer 1 and the mode of the UI device 10, which are stored in the memory 140, and stores the read-out modes in the memory 140 as modes to be changed to at the disconnection time (step 113).

Next, description will be given with reference to the flowchart of FIG. 4C. The user interface control section 143 (see FIG. 3) re-establishes the disconnected communication between the printer 1 and the UI device 10 after the UI device 10 (see FIG. 2) is recovered (step 121). After the communication is re-established, the system control section 147 reads the setting stored at step 102 (see FIG. 4A) and determines the mode to be changed to after the communication is re-established, based on the read setting (step 122). The system control section 147 causes both or either of the UI device 10 and the printer 1 to change to the determined mode (step 123).

The mode determination at step 122 will be described in detail.

Figure 7:
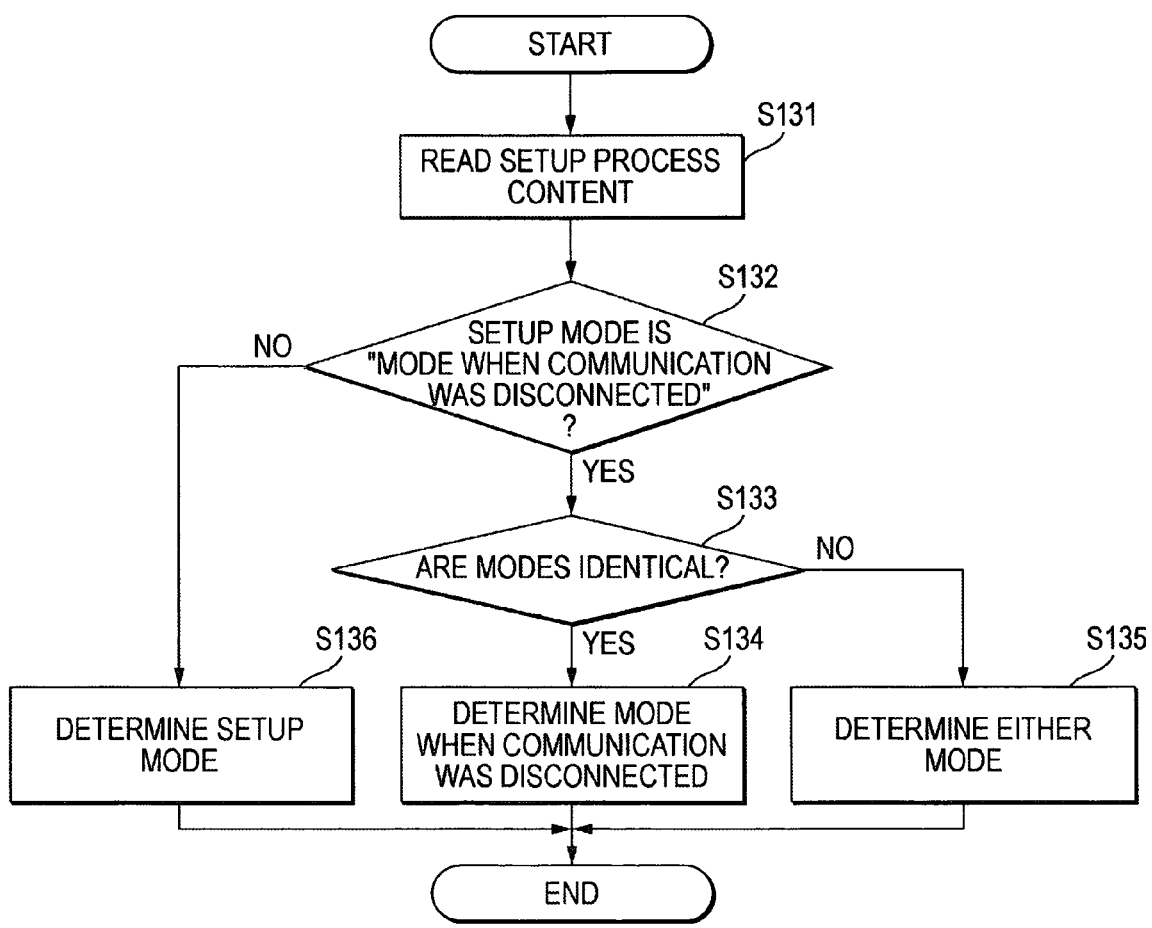
FIG. 7 is a flowchart of a procedure of determining a mode to be changed to after the communication is re-established.

FIG. 7 is a flowchart of a procedure of determining a mode to be changed to after the communication is re-established.

As shown in FIG. 7, first, the system control section 147 reads the settings made on the operation screen 10a shown in FIGS. 5 and 6 from the memory 140 (step 131). That is, the system control section 147 reads from the memory 140 (i) the settings of the mode at the re-establishment time and (ii) the action to be taken if the printer 1 and the UI device 10 are different in the mode when the communication was disconnected.

The system control section 147 determines as to whether or not the read mode at the re-establishment time is the "mode when communication was disconnected" (step 132). If the "mode when communication was disconnected" is set, the system control section 147 determines as to whether or not the mode of the printer 1 and the mode of the UI device 10, which are stored in the memory 140, are identical with each other (step 133).

If the mode of the printer 1 and the mode of the UI device 10, which are stored in the memory 140, are identical, the system control section 147 determines the identical mode as a mode to be changed to (step 134). If the modes are not identical, the system control section 147 determines either the mode of the printer 1 at the communication disconnection time or the mode of the UI device 10 at the communication disconnection time, based on the content of the settings read at step 131 (step 135). That is, if the content of the settings read at step 131 is "apply a mode of the printer," the system control section 147 determines the mode of the printer 1 at the communication disconnection time as the mode to be changed to at the re-establishment time. If the content of the settings read at step 131 is "apply a mode of the UI device," the system control section 147 determines the mode of the UI device 10 at the communication disconnection time as the mode to be changed to at the re-establishment time.

If the system control section 147 determines at step 132 that any other mode than the "mode when communication was disconnected" is set as the read mode at the re-establishment time, the system control section 147 determines the set mode as the mode to be changed to (step 136). That is, the system control section 147 adopts the read mode as the mode to be changed to at the re-establishment time.

The process procedure in this exemplary embodiment has been described. The process procedure at the re-establishment time shown in FIG. 4C will be described with more specific examples.

First Example

As a first example, a process performed when the UI device 10 (see FIG. 1) is turned on will be described. That is, if the power of the UI device 10 (see FIG. 1) is off and then the UI device 10 (FIG. 1) is turned on, the user interface control section 143 (see FIG. 3) re-establishes communication between the printer 1 and the UI device 10 (see step 121 in FIG. 4C). The system control section 147 (see FIG. 3) determines the mode to be changed to at the re-establishment time according to the procedure described above (see FIG. 7). Then, when the user interface control section 143 (see FIG. 3) sends to the UI device 10 a notification of the determined mode, the UI device 10 changes to the notified mode.

Second Example

As a second example, a process performed when the printer 1 (see FIG. 1) is turned on from a state where the printer 1 is powered off or in a power-saving state will be described. If the power of the printer 1 is off and then the printer 1 is turned on, the user interface control section 143 (see FIG. 3) re-establishes communication between the printer 1 and the UI device 10 and then determines the mode to be changed to. The printer 1 changes to the determined mode. Alternatively, the printer 1 may automatically change to the mode of the UI device 10.

Third Example

As a third example, a process performed when the UI device 10 is turned on after the printer 1 (see FIG. 1) is powered off or in the power-saving state and the UI device 10 is powered off will be described. A process performed when application software is started from a stop state in the UI device 10 as PC may be performed in a similar manner to that of this exemplary embodiment.

In such a case, communications between the printer 1 and the UI device 10 cannot be re-established until the printer 1 is turned on. Therefore, the UI device 10 displays that communications with the printer 1 cannot be re-established, on a display screen (not shown). If the printer 1 is turned on, the printer 1 re-establishes communication with the UI device 10 through the user interface control section 143.

Fourth Example

A fourth example is the case where the UI device 10 is operating, namely, the power of the UI device 10 is on and application software is running, and the printer 1 is powered off or in the power-saving state. In this case, the fact that communication with the printer 1 cannot be re-established is displayed on the display screen of the UI device 10 as described in the third example. If the printer 1 is turned on, communication between the UI device 10 and the printer 1 is re-established. The UI device 10 stops displaying that communication with the printer 1 cannot be re-established in the UI device 10.

Fifth Example

A fifth example is the case where communication are disconnected by turning off the printer 1 or placing the printer 1 in the power-saving state while the UI device 10 is operating (the power of the UI device 10 is on and application software is running). In such a case, the UI device 10 stores an operation command given to the printer 1 and various settings in the memory 10b, which may serve as a retention section (see FIG. 2). When communication with the printer 1 is re-established, the contents stored in the memory 10b are transmitted to the printer 1.

For each of the various settings, the most recent setup items are stored in the memory 10b. That is, previous setting is overwritten with new setting in the memory 10b. As such items, setting of a size of paper of a tray can be named, for example. In so doing, the most recent settings can be transmitted to the printer 1.

If plural users use the printer 1, it is also assumed that one user may want to circumvent changing of the setting by the other users (namely, may want to lock his/her setting). Therefore, it is also considered that the user is enabled to set inhibiting the setup item from being changed until the setting in the printer 1 is determined. If it becomes necessary during a job to turn on the printer 1 after turning off the printer 1, it is also considered that the setup items involved in the job are inhibited from being changed.

Sixth Example

A sixth example is the case where the UI device 10 is powered off or is in the power-saving state and the printer 1 is operating. In this case, the system control section 147 of the printer 1 stores a status of the printer 1 and information about the printer 1, which are to be sent to the UI device 10, in the memory 140. That is, the printer 1 stores the status and the information in the memory 140 until communication with the UI device 10 is re-established. When communication is re-established, the user interface control section 143 (see FIG. 3) transmits the status and the information, which are stored in the memory 140, to the UI device 10 in time sequence. The UI device 10 displays the most recent information to be displayed on a display screen (not shown).

Seventh Example

Figure 8:
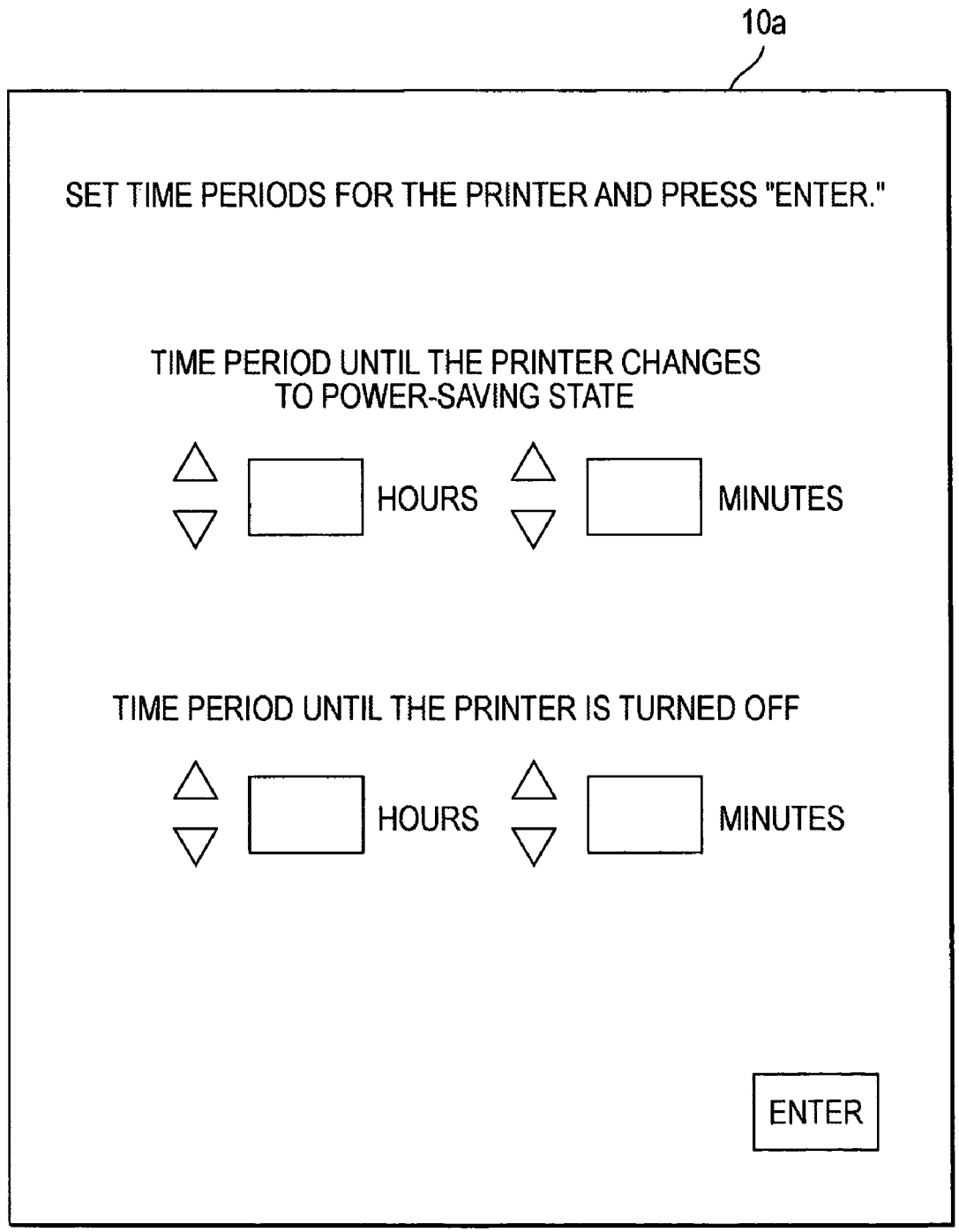
FIG. 8 is a diagram showing an operation screen of the UI device of a seventh example, for setting conditions of changing the printer to a power-saving state and power-off.

FIG. 8 is a drawing to show an example of the operation screen 10a of the UI device 10 for setting conditions to change the printer 1 to the power-saving state and power off.

As shown in FIG. 8, the user can set time periods relating to the printer 1 in advance. That is, the user can separately set the time period until the printer 1 changes to the power-saving state and the time period until the printer 1 is turned off. The UI device 10 retains the setup time information in the memory 140, which may serve as a retention section (see FIG. 3).

Accordingly, in the exemplary embodiment, if the UI device 10 becomes inoperative and becomes unrecoverable due to some reason or if connection to the UI device 10 is disconnected for long hours, the device controller 14 of the printer 1, which may serve as a power control section, waits until the time periods, which are set on the operation screen 10a shown in FIG. 8 in advance. Then, the device controller 14 turns off the printer 1 or causes the printer 1 to change to the power-saving state. The time period for power saving and the time period for power off can be set separately. If the setup time periods for power saving and the setup time period for power off are the same, the power is turned off.

FIG. 9 is a drawing to show an example of the operation screen 10a of the UI device 10 for setting conditions to change the UI device to screen save, the power-saving state, and power off for the UI device 10.

As shown in FIG. 9, the user can set time periods relating to the UI device 10 in advance. That is, the user can separately set the time period until the UI device 10 changes to screen save, the time period until the UI device 10 changes to the power-saving state, and the time period until the UI device 10 is turned off. The setup time-period information is retained in the memory 140 (see FIG. 3).

Accordingly, in the exemplary embodiment, the time periods for power saving and power off of the UI device 10 and the time periods for power saving and power off of the printer 1 can be set separately and are stored in the memory 140. For the UI device 10, the time period for screen save can also be set separately and is stored in the memory 140. Since the UI device 10 can be controlled independently of the printer 1, if the UI device 10 is not implemented as PC or WS, this configuration is preferred from the viewpoint of energy saving.

If the UI device 10 is placed continuously in a state where the UI device 10 is not operated for the setup time period, the UI device 10 changes to any of screen save, power saving, or power off. At the transition time, the UI device 10 notifies the printer 1 of the fact.

SECOND EMBODIMENT

Figure 10:
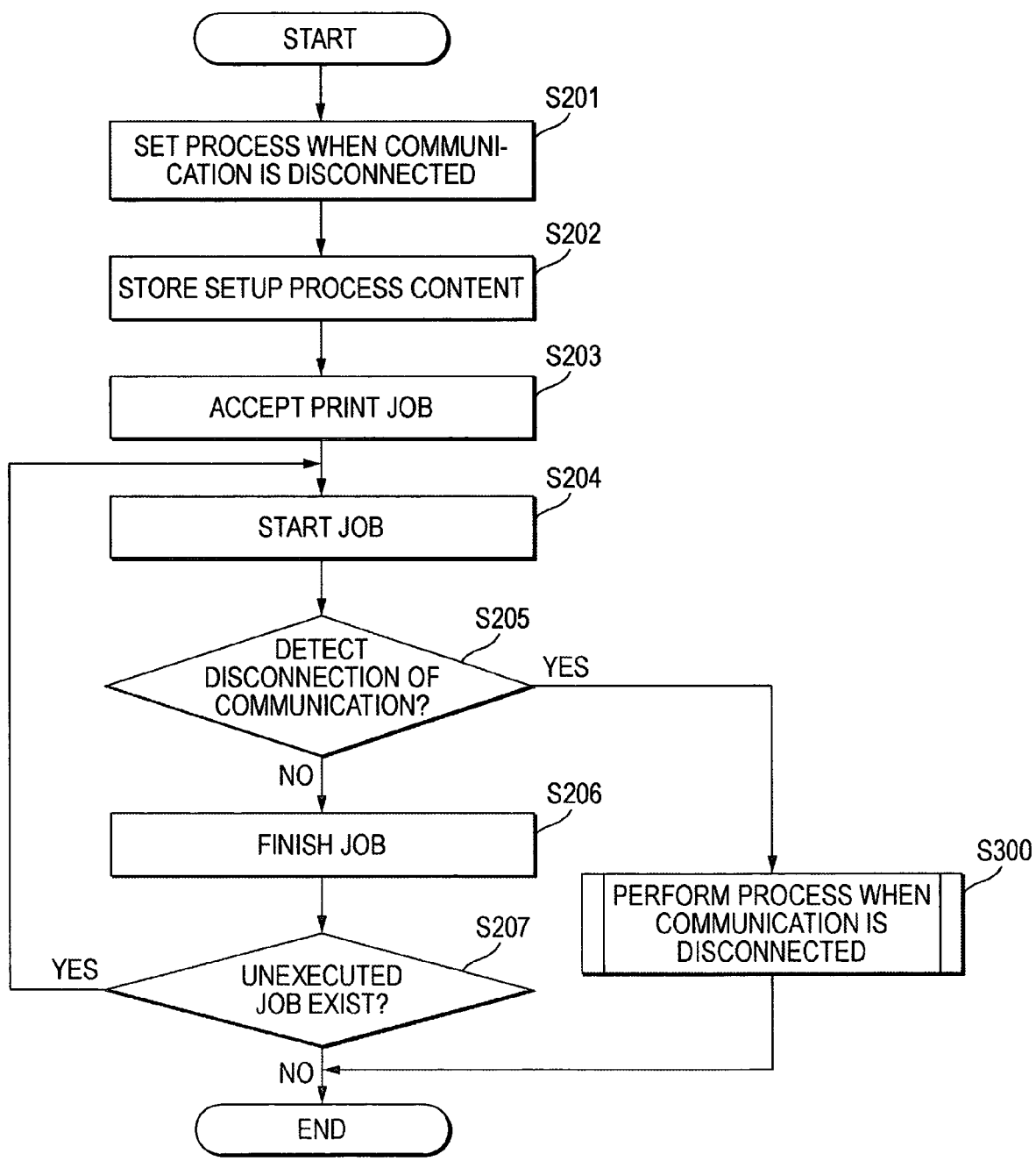
FIG. 10 is a flowchart of a process performed by a printer according to a second exemplary embodiment.

FIG. 10 is a flowchart of a process performed by the printer 1 according to a second exemplary embodiment First, process content (measure) performed when communication between the UI device 10 and the device controller 14 is disconnected is set through the UI device 10 (step 201). That is, a user sets a stop method of the job being executed and a continuation method of the job being executed through the UI device 10. If the user sets the process content that a job being executed is stopped when the communication is disconnected, the system control section 147 may stop the job being executed.

FIG. 11 is a diagram showing an example of an operation screen 10a of the user interface device 10 in the case where the process content, which is performed when communication is disconnected, is set.

As shown in FIG. 11, the user can select any one of four options as the process content, which is performed when a user interface control section 143 (see FIG. 3) detects during execution of a job that the communication between the UI device 10 and the device controller 14 is disconnected. Specifically, the options are "immediately stop a job," "stop jobs in set units," "stop after a job being executed is finished," and "stop after all jobs already accepted are finished." If the user presses an ENTER button after selecting any one of the four options, the selected one is decided. In the example shown in FIG. 11, the "immediately stop a job" is set as default.

The "immediately stop a job" refers to immediately stopping a job being executed if the disconnection is detected. The "stop jobs in set units" means that print is continued in set units in a job, for example, until a set being executed, and the job is stopped upon completion of the set. Here, the term "set units" may mean plural units which are contained in a single job and which are determined by number of original documents or number of printed copies. Specifically, it is assumed that disconnection of communication is detected in the course of printing a second page of an original during a print job, which prints two copies of the original consisting of four pages. In this case, two copies of the second page of the original are printed and the job is stopped if no sorter is provided. If a sorter is provided, the second, third and fourth pages of the original are printed each one copy and the job is stopped.

The "stop after a job being executed is finished" means that a job is continued until a job being executed is finished and the remaining jobs are stopped after the job being executed is finished. For example, it is assumed that the disconnection of the communication is detected in the course of printing a second page of an original in a print job of printing the original consisting of four pages each two copies. In this case, the job is continued until two copies of the original is printed. Further, the job is continued in job units. Therefore, if plural jobs are accepted, unexecuted jobs are left as they are. The "stop after all jobs already accepted are finished" means that a process is continued until all of the already accepted jobs are finished and the process is stopped after all the jobs are finished.

Turning to FIG. 10, if the process content is set on the operation screen 10a of the UI device 10 (see FIG. 11), the system control section 147 of the device controller 14 (see FIG. 3) stores the setup process content is stored in memory 140, which may serve as a retention section (see FIG. 3), as information (step 202).

If a print job transmitted through a network from an external machine exists, the external controller 300 (see FIG. 2) accepts the print job (step 203) and the job is started under the control of the device controller 14 (see FIGS. 2 and 3; step 204).

After the job is started, the user interface control section 143 (see FIG. 3) checks as to whether or not communication between the UI device 10 and the device controller 14 is disconnected (step 205). When the user interface control section 143 detects that the communication is disconnected, a "process at communication disconnection time" is started based on the process content stored at step 202 (step 300). If the job is finished with communication disconnection being not detected (step 206), whether or not an unexecuted job exists among the accepted jobs is determined (step 207) and if an unexecuted job exists, the job is started; if an unexecuted job does not exist, the processing is terminated.

Figure 12:
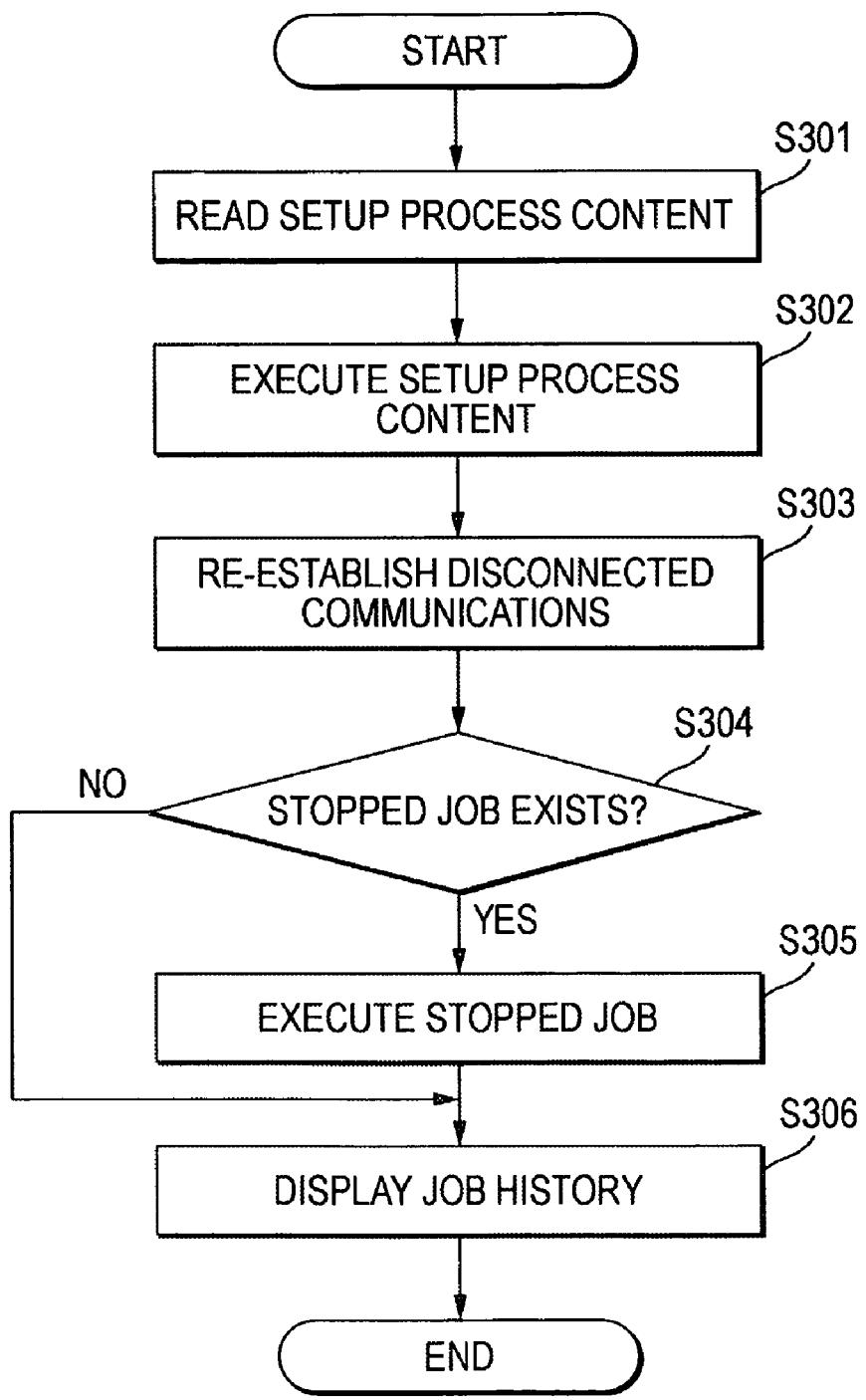
FIG. 12 is a flowchart of a process performed when the communication is disconnected.

FIG. 12 is a flowchart of a process performed when the communication is disconnected.

The process at the communication disconnection time in this exemplary embodiment is performed as follows. First, the system control section 147 (see FIG. 3) reads the process content stored in the memory 140 (see FIG. 3) at step 202 (see FIG. 10; step 301). The process content mentioned here may be any of "immediately stop a job," "stop jobs in set units," "stop after a job being executed is finished," or "stop after all jobs already accepted are finished."

The system control section 147 executes the read process content (step 302). That is, if the read process content is "immediately stop a job," the job being executed is immediately stopped under the control of the system control section 147. If the read process content is "stop jobs in set units," after a corresponding set is finished, the job is stopped under the control of the system control section 147. If the read process content is "stop after a job being executed is finished, after the job being executed is finished, the process is stopped under the control of the system control section 147. If the read process content is "stop after all jobs already accepted are finished," after all the jobs already accepted are completed, the process is stopped under the control of the system control section 147.

The system control section 147, which may serve as a job information management section, manages the job stopped at step 302 and stores a stop reason in the memory 140. That is, the system control section 147 and the memory 140 form a part of a retention section that acquires and retains information of the stopped job being executed.

After the UI device 10 is recovered, the user interface control section 143 re-establishes the disconnected communication between the UI device 10 and the device controller 14 (step 303).

Then, the system control section 147, which may serve as a job information management section, determines as to whether or not a stopped job exists (step 304). That is, if the process content read at step 301 is "immediately stop a job" or "stop jobs in set units," a job is stopped before the job is finished. The stop reason for such a job is retained in the memory 140. A command indicating how such a stopped job is to be processed is accepted from the user.

FIG. 13 is an example of the operation screen 10a of the UI device 10 in the case where the process content for the stopped job is set.

As shown in FIG. 13, the user can select "restart the stopped job" or "cancel the stopped job." The system control section 147 advances a process of the stopped job in accordance with the command entered by the user (see step 305 in FIG. 12).

Turning to FIG. 12, the device controller 14 transmits a job history to the UI device 10. The UI device 10 displays the job history received from the device controller 14 (step 306).

If the UI device 10 is thus configured as an external device of the printer 1, a situation where it is difficult to synchronize the printer 1 and the UI device 10 with each other for control may occur. In this exemplary embodiment, however, even if one of the UI device 10 and the image forming apparatus main body is inoperative, it is possible to operate the other, which is normal.

At step 201 shown in FIG. 10, the user can input in advance setting regarding acceptance of a job after communication is disconnected during job execution. If the user inputs the setting in advance, the setting is stored in the memory 140, which may serve as a storage section (see FIG. 3), and is read from the memory 140 at step 301 shown in FIG. 12. The acceptance of a job will be furthermore described.

FIG. 14 is a drawing to show an example of the operation screen 10a of the UI device 10 for inputting the setting regarding the acceptance of a job after the communication is disconnected during job execution.

The user can select "a new job is not accepted" or "a new job is accepted but is not executed" on the operation screen 10a of the UI device 10 shown in FIG. 14. If the user selects "a new job is not accepted," the external controller 300 (see FIG. 2) does not accept any new jobs after the communication is disconnected. On the other hand, if the user selects "a new job is accepted but is not executed," the external controller 300 (see FIG. 2) accepts a new job even after the communication is disconnected, but does not execute the accepted new job.

THIRD EXEMPLARY EMBODIMENT

A third exemplary embodiment of the invention is almost the same as the second exemplary embodiment previously described with reference to the flowchart of FIG. 10 except that not only the operation screen 10a of the UI device 10 shown in FIG. 11, but also an operation screen 10a of UI device 10 shown in FIG. 15 is displayed at step 201 shown in FIG. 10. The third exemplary embodiment is different from the second exemplary embodiment in process content at step 300 shown in FIG. 10.

FIG. 15 is a drawing showing an example of an operation screen 10a of the UI device 10 for setting the process content performed when a job stop factor occurs during job execution after communication is disconnected.

As shown in FIG. 15, the user can select "keep stopping a job until a job stop factor is removed" or "execute executable jobs" as an option when a job stop factor occurs during job execution after communication is disconnected.

Further, if the user selects "stop jobs in set units," "stop after a job being executed is finished," or "stop after all jobs already accepted are finished" on the operation screen 10a of the UI device 10 shown in FIG. 11, job execution is continued still after communication is disconnected. In this exemplary embodiment, a process to be performed when some job stop factor occurs during execution of the continued job is determined in advance.

Therefore, when the user selects any other process content than "immediately stop a job" shown in FIG. 11, namely, "stop jobs in set units," "stop after a job being executed is finished," or "stop after all jobs already accepted are finished" at step 201 shown in FIG. 10, the operation screen 10a of the UI device 10 shown in FIG. 15 is displayed.

As the "job stop factor" mentioned here, occurrence of a paper jam and a paper-out condition can be named, for example.

If there are plural paper trays (not shown) for storing sheets of paper used in printing by an image output section 12 (see FIG. 2), paper of a different size can be stored in the trays. For example, it is assumed that the job stop factor is a paper-out condition of paper having any other size than A4. In this case, if the job is a job for printing on A4-size paper, the job cannot be continued or executed. However, if the job is a job for printing on paper of any other size than A4, for example, on B5-size paper, the job can be executed without any problem. Thus, when a job stop factor occurs, the already accepted jobs may contain an executable job. Thus, if a job stop factor occurs and an executable job exists, this exemplary embodiment enables the user to specify whether or not to execute the executable job.

The "keep stopping a job until a job stop factor is removed" mentioned here means that if a job is executed after communication is disconnected and then a job stop factor occurs, all jobs are stopped and are not executed until the job stop factor is removed.

The "execute executable jobs" means that if (i) a job is executed after communication is disconnected, then (ii) a job stop factor occurs and (iii) other jobs already accepted contain an executable job, the executable job is executed. Specifically, although a paper-out condition of A4-size paper occurs during execution of a job for printing on A4-size paper, if (i) a paper-out condition of paper having any other size-does not occur and (ii) the already accepted jobs contain a job for printing on B5-size paper, the executable job for printing on B5-size paper is executed.

Figure 16:
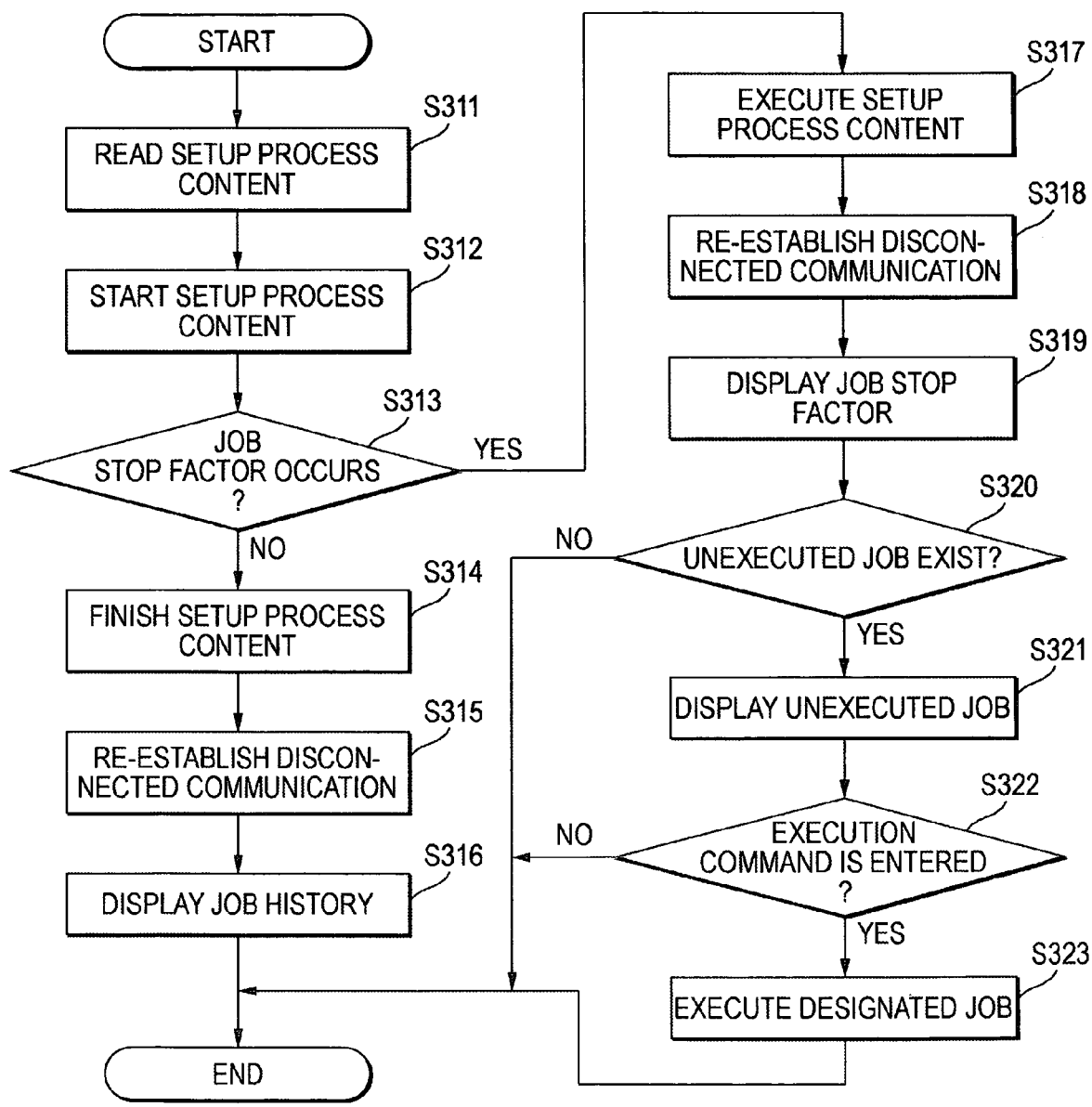
FIG. 16 is a flowchart of a process performed when communication is disconnected in a third exemplary embodiment.

FIG. 16 is a flowchart describing a process performed when communication is disconnected according to the third exemplary embodiment of the invention. That is, FIG. 16 shows the description of step 300 sown in FIG. 10.

In this exemplary embodiment, first the system control section 147 (see FIG. 3) reads the process content stored in memory 140 (see FIG. 3; step 311). In this exemplary embodiment, the process content read from the memory 140 contains not only the process content after communication is disconnected but also the process content to be performed when a job stop factor occurs during job execution after communication is disconnected as described above.

The system control section 147 starts the read process content (step 312). The system control section 147 determines as to whether or not a job stop factor occurs (step 313) until the process is finished. If the setup process is finished without occurrence of a job stop factor (step 314), the user interface control section 143 re-establishes the disconnected communication (step 315) and the UI device 10 displays the job history (step 316) as in the second exemplary embodiment shown in FIG. 12.

When a job stop factor occurs at step 313, the system control section 147 retains the job stop factor (error cause) in the memory 140 and then executes the process content to be performed when the job stop factor occurs (step 317). That is, if the read process content is "keep stopping a job until a job stop factor is removed," even if another executable job exists, the executable job is not executed. If the read process content is "execute executable jobs," a job executable regardless of occurrence of the job stop factor is executed under the control of the system control section 147.

The user interface control section 143 re-establishes the disconnected communications between the UI device 10 and a device controller 14 after the UI device 10 is recovered (step 318).

Then, the system control section 147 of the device controller 14 reads the job stop factor retained in the memory 140 and transmits the job stop factor to the UI device 10 through the user interface control section 143. The UI device 10 displays the job stop factor received from the device controller 14 (step 319).

Then, the system control section 147 determines as to whether or not an unexecuted job exists in the accepted jobs (step 320). If an unexecuted job exists, the system control section 147 causes the UI device 10 to display the unexecuted job (step 321). If the user enters an execution command of the unexecuted job displayed on the UI device 10 (step 322), the system control section 147 executes the designated unexecuted job (step 323) and terminates the process. It is also considered that the operation screen 10a shown in FIG. 13 enables the user to enter an action to be taken for the stopped incomplete job.

FOURTH EXEMPLARY EMBODIMENT

Figure 18:
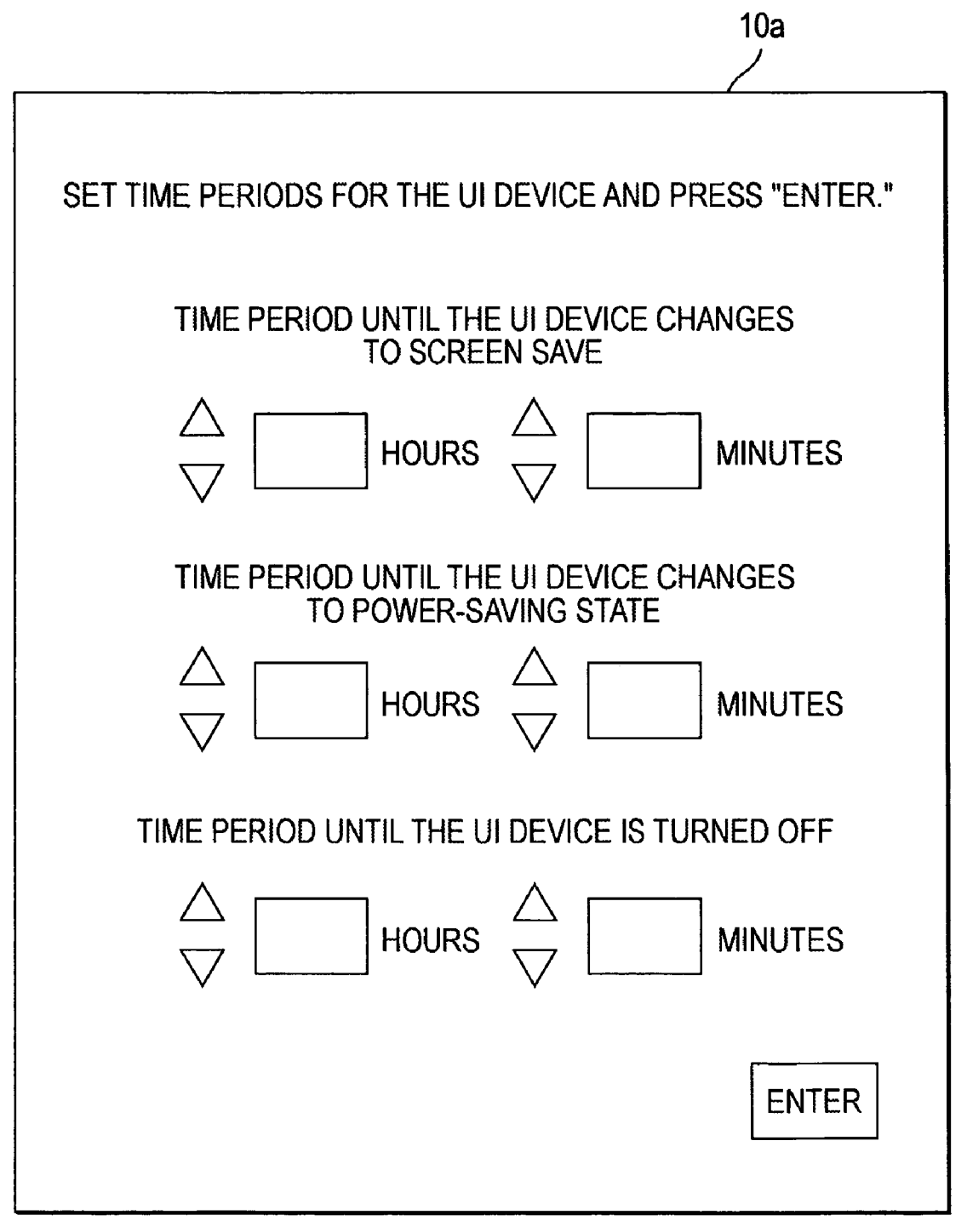

A fourth exemplary embodiment of the invention is almost the same as the second exemplary embodiment previously described with reference to the flowchart of FIG. 10 except that not only the operation screen 10a of the UI device 10 shown in FIG. 11, but also operation screens 10a of UI device 10 shown in FIGS. 17 and 18 are displayed at step 201 shown in FIG. 10.

FIG. 17 is a drawing showing an example of the operation screen 10a of the UI device 10 for setting a condition of changing the printer 1 to a power-saving state and power off.

As shown in FIG. 17, the user can set in advance time periods about the printer 1. That is, the user can separately set a time period until the printer 1 changes to the power-saving state and a time period until the printer 1 is turned off. The setup time information is retained in memory 140, which may serve as a retention section (see FIG. 3).

Thus, in this exemplary embodiment, if the UI device 10 becomes inoperative and becomes unrecoverable during job execution due to some reason or if connection to the UI device 10 is disconnected for long hours, the device controller 14 of the printer 1, which may serve as a power control section, waits for the expiration of the time period set in advance on the operation screen 10a shown in FIG. 17 and turns off the printer 1 or changes the printer 1 to the power-saving state. The setup time period for power saving and the setup time period for power off can be set separately. If the setup time period for power saving and the setup time period for power off are the same, the printer 1 is turned off. If the process shown in FIG. 12 to be performed when the communication is disconnected is being performed when the setup time period has elapsed, the processing sequence is executed to the end and the printer 1 is turned off or the printer changes to the power-saving state.

FIG. 18 is a drawing showing an example of the operation screen 10a of the UI device 10 for setting conditions of changing the UI device 10 to screen save, the power-saving state and power off.

As shown in FIG. 18, the user can set in advance time periods for the UI device 10. That is, the user can separately set a time period until the UI device 10 changes to screen save, a time period until the UI device 10 changes to the power-saving state, and a time period until the UI device 10 is turned off. The setup time-period information is retained in the memory 140 (see FIG. 3).

Thus, in this exemplary embodiment, the setup time period for power saving and the setup time period for power off of the UI device 10 and the setup time period for power saving and the setup time period for power off of the printer 1 can be set separately and are stored in the memory 140. For the UI device 10, the setup time period for screen save can also be set separately and is stored in the memory 140. Since the UI device 10 can be controlled independently of the printer 1, if the UI device 10 is not implemented as PC or WS, this configuration is preferred from the viewpoint of energy saving.

If the UI device 10 is placed continuously in a state where the UI device 10 is not operated for the setup time period even during job execution, the UI device 10 changes to any of screen save, power saving, or power off. At the transition time, the UI device 10 notifies the printer 1 of the fact.

The foregoing description of the exemplary embodiments of the invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming system comprising:
   an image forming apparatus that accepts a print command from an external device and forms an image on a recording material according to the print command; and
   a user interface device connected to the image forming apparatus so as to be able to communicate with the image forming apparatus, the user interface device that accepts entry from a user, outputs the entry to the image forming apparatus and displays information based on data input from the image forming apparatus, wherein:
   power control and power supply are performed for the image forming apparatus and the user interface device separately,
   the image forming apparatus comprises:
      a detection section that detects as to whether or not communication between the image forming apparatus and the user information device is disconnected;
      a storage section that stores a mode of the image forming apparatus and a mode of the user interface device when the detection section detects that the communication is disconnected;
      a re-establishment section that re-establishes the disconnected communication between the image forming apparatus and the user interface device; and
      a mode control section that controls (i) a mode, after the re-establishing by the re-establishment section, of the image forming apparatus and (ii) a mode, after the re-establishing by the re-establishment section, of the user interface device based on the mode of the image forming apparatus and the mode of the user interface device, which are stored in the storage section.

2. The system according to claim 1, wherein:
   the user interface device allows the user to input the mode, after the re-establishing by the re-establishment section, of the image forming apparatus and the mode, after the re-establishing by the re-establishment section, of the user interface device, and
   the storage section stores the mode, after the re-establishing by the re-establishment section, of the image forming apparatus and the mode, after the re-establishing by the re-establishment section, of the user interface device, which are input by the user through the user interface device.

3. The system according to claim 1, wherein the mode control section changes the mode of the image forming apparatus to the mode of the user interface device, which is stored in the storage section, after the re-establishment section re-establishes the disconnected communication.

4. The system according to claim 1, wherein the user interface device further comprises a display section that displays that the communication between the image forming apparatus and the user interface device is not re-established if the disconnected communication has not been re-established.

5. The system according to claim 4, wherein if the re-establishment section re-establishes the communication, the user interface device causes the display section to cancel displaying that the communication between the image forming apparatus and the user interface device is not re-established and then the mode control section controls the mode, after the re-establishing, of the user interface.

6. The system according to claim 1, wherein the user interface device comprises a retention section that retains information to be sent to the image forming apparatus after the detection section detects that the communication is disconnected and before the re-establishment section re-establishes the communication.

7. The system according to claim 6, wherein:
   the information retained in the retention section includes a plurality of items,
   the user interface device allows the user to input information including a plurality of items, and
   if one of the items of the information newly input by the user is identical with corresponding one of the items of the retained information, the retention section replaces the one of the items of the newly input information with the corresponding one of the items of the retained information and stores the newly input information.

8. The system according to claim 6, wherein:
the information retained in the retention section includes a plurality of items,
the user interface device allows the user to input information including a plurality of items, and
if one of the items of the information newly input by the user is identical with corresponding one of the items of the retained information, the retention section prohibits the one of the items of the newly input information from being replaced with the corresponding one of the items of the retained information.

9. An image forming apparatus comprising:
an image forming apparatus main body configured to be connectable to an external user interface device, wherein power control and power supply for the image forming apparatus main body are performed separately from power control and power supply for the user interface device, and the image forming apparatus main body accepts a print command from an external device and forms an image on a recording material according to the print command;
a detection section that detects as to whether or not communication between the image forming apparatus main body and the user interface device is disconnected;
a storage section that stores a mode of the image forming apparatus and a mode of the user interface device when the detection section detects that the communication is disconnected;
a re-establishment section that re-establishes the disconnected communication between the image forming apparatus and the user interface device; and
a mode control section that controls (i) a mode, after the re-establishing by the re-establishment section, of the image forming apparatus and (ii) a mode, after the re-establishing by the re-establishment section, of the user interface device based on the mode of the image forming apparatus and the mode of the user interface device, which are stored in the storage section.

10. The apparatus according to claim 9, further comprising:
a power control section; and
a retention section that retains as information at least one of (i) a time period from a time when the detection section detects that the communication is disconnected to a time when the power control section causes the image forming apparatus main body to be in the power-saving state and (ii) a time period from the time when the detection section detects that the communication is disconnected to a time when the power control section causes the image forming apparatus main body to be in a power off state.

11. An image forming apparatus comprising:
an image forming apparatus main body configured to be connectable to an external user interface device, wherein power control and power supply for the image forming apparatus main body is performed separately from power control and power supply for the user interface device, and the image forming apparatus main body accepts a print command from an external device and forms an image on a recording material according to the print command;
a detection section that detects as to whether or not communication between the image forming apparatus and the user information device is disconnected;
a re-establishment section that re-establishes the disconnected communication between the image forming apparatus and the user interface device;
a storage section that stores a mode of the image forming apparatus and a mode of the user interface device, which are set by a user in advance, as a mode, after the re-establishing by the re-establishment section, of the image forming apparatus and a mode, after the re-establishing by the re-establishment section, of the user interface device; and
a mode control section that controls (i) the mode, after the re-establishing by the re-establishment section, of the image forming apparatus and (ii) the mode, after the re-establishing by the re-establishment section, of the user interface device based on the mode of the image forming apparatus and the mode of the user interface device, which are stored in the storage section.

12. An image forming system comprising:
an image forming apparatus that accepts a print command from an external device and forms an image on a recording material according to the print command; and
a user interface device connected to the image forming apparatus so as to be able to communicate with the image forming apparatus, the user interface device that accepts entry from a user, outputs the entry to the image forming apparatus and displays information based on data input from the image forming apparatus, wherein:
power control and power supply are performed for the image forming apparatus and the user interface device separately, and
the image forming apparatus comprises:
    a detection section that detects whether or not communication between the image forming apparatus and the user interface device is disconnected; and
    a retention section that retains information relating to a process, which is to be performed on an already accepted print command when the detection section detects that the communication is disconnected.

13. The system according to claim 12 wherein:
the user interface device allows the user to select one from among a plurality of predetermined processes,
the user interface device transmits information relating to the selected one process to the image forming apparatus, and
the retention section retains the transmitted information relating to the selected one process.

14. The system according to claim 12, wherein the image forming apparatus further comprises a re-establishment section that re-establishes the disconnected communication between the image forming apparatus and the user interface device.

15. The system according to claim 14, wherein:
if the retained information relates to a process of stopping at least one print command already accepted, the image forming apparatus stops the at least one print command already accepted when the detection section detects that the communication is disconnected, and
after the re-establishment section re-establishes the communication between the image forming apparatus and the user interface device, the image forming apparatus restarts or cancels the stopped at least one print command.

16. The system according to claim 12, wherein:
if the retained information relates to a process of stopping a print command currently being executed, the image forming apparatus stops the print command currently being executed when the detection section detects that the communication is disconnected,
the retention section retains the information indicating which print process is stopped, and the retention section transmits the retained information indicating which print process is stopped to the user interface device after the re-establishment section re-establishes the communication between the image forming apparatus and the user interface device.

17. The system according to claim 12, wherein the image forming apparatus further comprises a storage section that stores information as to whether or not a new print command is to be accepted after the detection section detects that the communication is disconnected.

18. The system according to claim 12, wherein the image forming apparatus further comprises:
 a device controller;
 a power control section; and
 a storage section that stores as information at least one of (i) a time period from a time when the detection section detects that the communication is disconnected to a time when the power control section causes the device controller to be in the power-saving state and (ii) a time period from the time when the detection section detects that the communication is disconnected to a time when the power control section causes the device controller to be in a power off state.

19. An image forming apparatus comprising:
 an image forming apparatus main body configured so as to be connectable to an external user interface device, wherein power control and power supply for the image forming apparatus body is performed separately from power control and power supply for the user interface device and the main body accepts a print command from an external device and forms an image on a recording material according to the print command;
 a detection section that detects as to whether or not communication between the image forming apparatus and the user information device is disconnected; and
 a retention section that retains (i) information of a process, which is to be performed on an already accepted print command when the detection section detects that the communication is disconnected, the process including continuing the already accepted print command and (ii) information of a process, which is to be performed by the image forming apparatus main body on a stop factor occurring in continuing the already accepted print command.

20. The apparatus according to claim 19, wherein the retained information of the process to be performed on the stop factor contains executing an executable print command, which is not affected by the stop factor.

21. The apparatus according to claim 19, further comprising:
 a power control section; and
 a storage section that stores at least one of (i) a time period from a time when the detection section detects that the communication is disconnected to a time when the power control section causes the image forming apparatus main body to be in the power-saving state and (ii) a time period from the time when the detection section detects that the communication is disconnected to a time when the power control section causes the image forming apparatus main body to be in a power off state, and
 if the at least one of the stored time periods has been elapsed and the image forming apparatus executes a print command, the power control section causes the image forming apparatus main body to be in the power saving state or turn off the image forming apparatus main body in accordance with the elapsed time period after the executed print command is finished.

* * * * *